United States Patent
Feyer

(10) Patent No.: US 10,078,308 B2
(45) Date of Patent: Sep. 18, 2018

(54) TIMEPIECE WHEEL WITH PLAY TAKE-UP

(71) Applicant: Blancpain SA, Le Brassus (CH)

(72) Inventor: Julien Feyer, Vernier (CH)

(73) Assignee: Blancpain SA, Le Brassus (CH)

( * ) Notice: Subject to any disclaimer, the term of this patent is extended or adjusted under 35 U.S.C. 154(b) by 0 days.

(21) Appl. No.: 15/420,735

(22) Filed: Jan. 31, 2017

(65) Prior Publication Data

US 2017/0242399 A1 Aug. 24, 2017

(30) Foreign Application Priority Data

Feb. 19, 2016 (EP) .................................... 16156477

(51) Int. Cl.
| | |
|---|---|
| *G04B 13/02* | (2006.01) |
| *G04B 15/14* | (2006.01) |
| *F16H 55/18* | (2006.01) |
| *G04B 35/00* | (2006.01) |

(52) U.S. Cl.
CPC .............. *G04B 15/14* (2013.01); *F16H 55/18* (2013.01); *G04B 13/026* (2013.01); *G04B 13/027* (2013.01); *G04B 35/00* (2013.01)

(58) Field of Classification Search
CPC ...... G04B 15/14; G04B 13/026; G04B 35/00; F16H 55/18; Y10T 74/19633
See application file for complete search history.

(56) References Cited

U.S. PATENT DOCUMENTS

| 9,322,465 | B2* | 4/2016 | Sandner | ................ | F16H 55/18 |
|---|---|---|---|---|---|
| 2002/0128098 | A1* | 9/2002 | Mott | ...................... | F16H 55/30 |
| | | | | | 474/94 |
| 2006/0048596 | A1 | 3/2006 | Wiederrecht | | |
| 2007/0180943 | A1 | 8/2007 | Daout | | |
| 2010/0043578 | A1 | 2/2010 | Daout | | |
| 2010/0232035 | A1* | 9/2010 | Takamatsu | ............. | F16H 55/18 |
| | | | | | 359/696 |

(Continued)

FOREIGN PATENT DOCUMENTS

| CH | 218688 | 12/1941 |
|---|---|---|
| CH | 708 553 A2 | 3/2015 |

(Continued)

OTHER PUBLICATIONS

European Search Report dated Jul. 27, 2016 in European Application 16156477.8, filed on Feb. 19, 2016 (with English Translation of Categories of cited documents).

*Primary Examiner* — Sean Kayes

(74) *Attorney, Agent, or Firm* — Oblon, McClelland, Maier & Neustadt, L.L.P.

(57) ABSTRACT

Timepiece wheel with play take-up, including a toothing, each tooth of which includes first and second half-teeth each including a part of the tooth profile, and movable with respect to each other against elastic return means, the wheel including, axially stacked, a first and a second half-wheel respectively carrying the first and second half-teeth and having limited rotational mobility with respect to each other, about the axis of this toothing, and against the elastic return means, the toothing of each half-wheel overhanging the other half-wheel, each half-wheel including hollows inside each of which is movable an opposite half-tooth, between two successive half-teeth.

14 Claims, 4 Drawing Sheets

(56) References Cited

U.S. PATENT DOCUMENTS

| | | | | |
|---|---|---|---|---|
| 2010/0242649 A1* | 9/2010 | Vandewal | ............... | F16H 55/18 |
| | | | | 74/409 |
| 2013/0333504 A1 | 12/2013 | Klinger et al. | | |
| 2015/0138932 A1* | 5/2015 | Oes | ......................... | G04B 1/12 |
| | | | | 368/142 |
| 2016/0377171 A1* | 12/2016 | Ryu | ....................... | F16H 55/18 |
| | | | | 74/409 |

FOREIGN PATENT DOCUMENTS

| | | |
|---|---|---|
| DE | 10 2009 037 624 A1 | 7/2010 |
| EP | 1 380 772 A1 | 1/2004 |
| EP | 1 555 584 A1 | 7/2005 |
| EP | 2 672 335 A1 | 12/2013 |

* cited by examiner

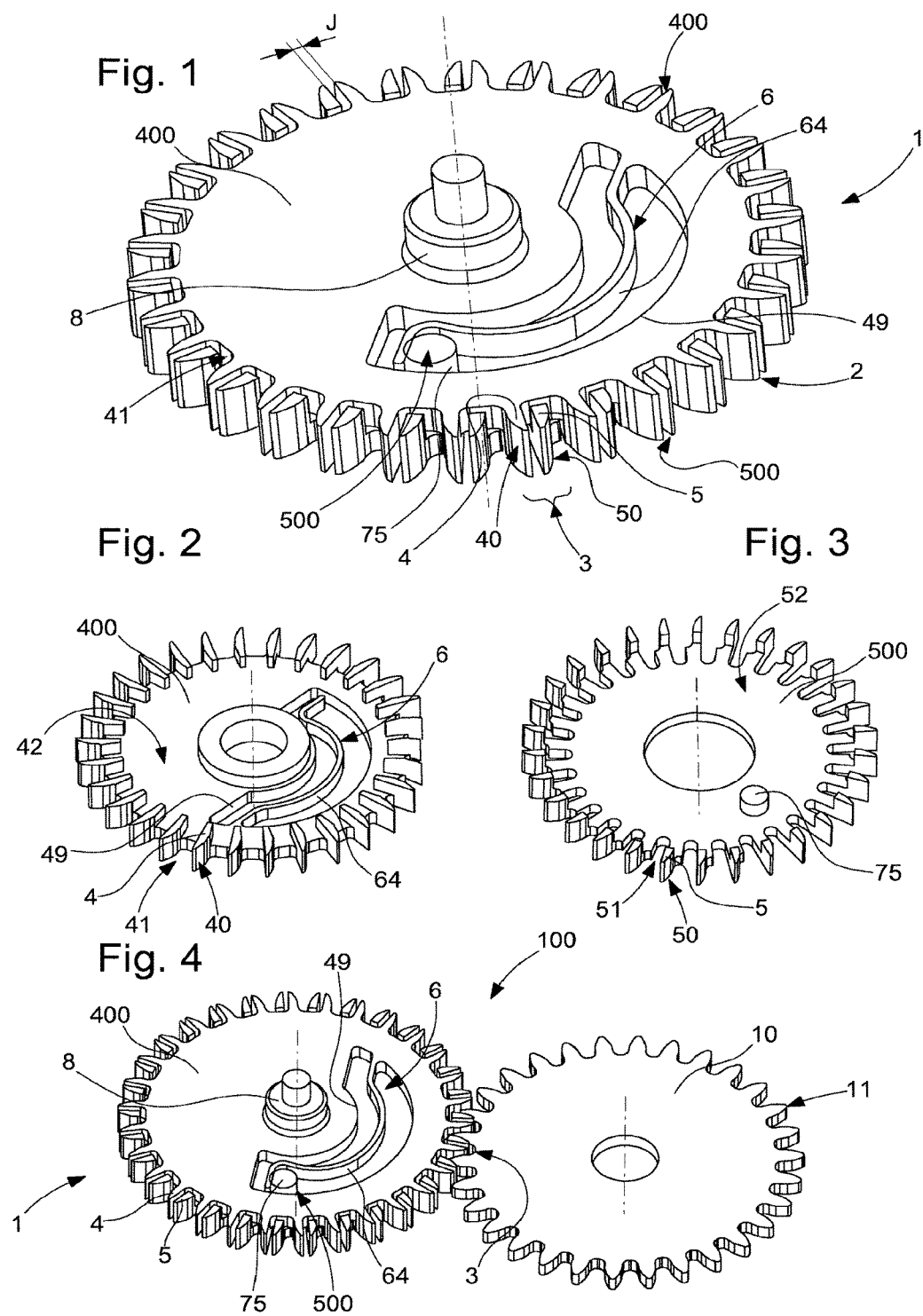

TIMEPIECE WHEEL WITH PLAY TAKE-UP

This application claims priority from European Patent Application No. 16156477.8 filed on Feb. 19, 2016, the entire disclosure of which is hereby incorporated by reference.

FIELD OF THE INVENTION

The invention concerns a composite timepiece wheel with play take-up, including a peripheral toothing wherein each tooth includes, on either side of its median part, a first half-tooth including a first part of the tooth profile, and a second half-tooth including a second part of the tooth profile, each first half-tooth being movable with respect to the second half-tooth of the same tooth, against elastic return means tending to move the first half-tooth and the second half-tooth of the same tooth way from each other.

The invention also concerns a timepiece train comprising at least one such wheel and a complementary wheel.

The invention also concerns a timepiece movement including at least one such timepiece train, or including at least one such wheel.

The invention also concerns a watch including such a movement, or including at least one such timepiece train, or including at least one such wheel.

The invention concerns the field of timepiece mechanisms including gear trains.

BACKGROUND OF THE INVENTION

There are known mechanisms including gears with play take-up comprising at least one wheel with two flanges coupled via an elastic element, especially in the heavy engineering industry: machine-tools, shaping machines, automobiles, motors, energy transmission, rack railways. These proven technologies are ill-suited to miniaturisation inside a micro-mechanical assembly, and more particularly inside a timepiece movement.

Horology has instead developed one-piece wheels including elastic elements for taking up play with an opposing wheel, in the form of an elastic toothing, particularly with teeth in several parts including flexible strips, or in the form of a toothing with complete teeth, carried by elastic strips or spokes These wheels are often devised for a single direction of rotation. When these wheels have several levels, which may or may not be in one-piece, the opposing wheel must generally be in mesh with all the levels at the same time. The creation of such wheels requires particular production means, is difficult and expensive, and these wheels remain fragile, particularly in the event of shocks.

SUMMARY OF THE INVENTION

The invention proposes to make wheels for horological use, having moderate manufacturing costs, capable of replacing existing wheels in movements without modifying the latter, and which are compact, particularly in terms of thickness.

The invention therefore concerns a composite timepiece wheel with play take-up.

The invention also concerns a timepiece train, including at least one such wheel and a complementary wheel.

The invention also concerns a timepiece movement including at least one such timepiece train, or including at least one such wheel.

The invention also concerns a watch including such a movement, or including at least one such timepiece train, or including at least one such wheel.

BRIEF DESCRIPTION OF THE DRAWINGS

Other features and advantages of the invention will appear upon reading the following detailed description, with reference to the annexed drawings, in which:

FIG. 1 represents a schematic, perspective, top view of a composite timepiece wheel with play take-up according to the invention, including a first upper half-wheel and a second lower half-wheel, which are coaxial, mounted head-to-tail and fitted or encased one inside the other, each including a toothing peripherally forming one part of the total profile and axially protruding from the other half-wheel.

FIG. 2 represents, in a similar manner to FIG. 1, only the first upper half-wheel, turned over relative to FIG. 1.

FIG. 3 represents, in a similar manner to FIG. 1, only the second lower half-wheel, in the same position as in FIG. 1.

FIG. 4 represents, a schematic, perspective view of a composite train of the wheel of FIG. 1 and of a complementary wheel meshing with the latter wheel.

DETAILED DESCRIPTION OF PREFERRED EMBODIMENTS

Figure 5:
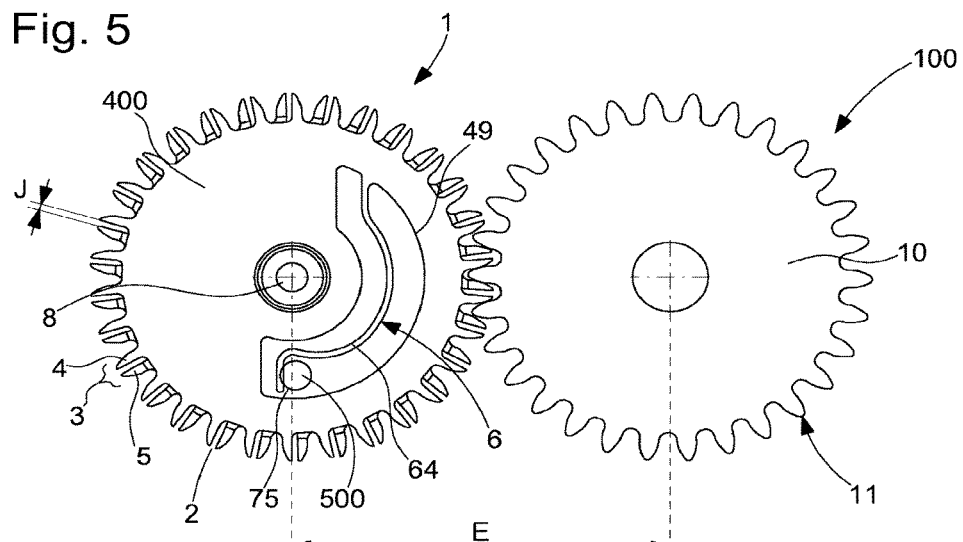
FIGS. 5 and 6 represent schematic, plan, top and bottom views of the gear train of FIG. 4.
Figure 6:
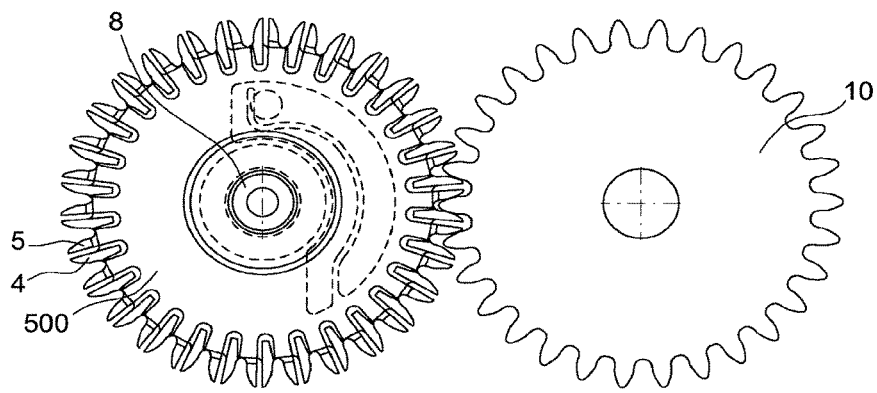

The invention concerns a composite timepiece wheel 1 with play take-up, including a peripheral toothing 2, each tooth 3 of which includes, on either side of its median part, a first half-tooth 4 including a first part 40 of the tooth profile, and a second half-tooth 5 including a second part 50 of the tooth profile. Each first half-tooth 4 is movable with respect to second half-tooth 5 of the same tooth 3, against elastic return means 6, which tend to move first half-tooth 4 and second half-tooth 5 of the same tooth 3 away from each other.

Wheel 1 according to the invention is arranged to work in both directions of rotation.

According to the invention, wheel 1 includes a first half-wheel 400 carrying all the first half-teeth 4, axially stacked with a second half-wheel 500 carrying all the second half-teeth 5.

First half-wheel 400 and second half-wheel 500 have limited rotational mobility with respect to each other, about the axis of toothing 2, and against elastic return means 6.

The toothing of each half-wheel protrudes from the other half-wheel, the first half-wheel 400 including first hollows 41, inside each of which a second half-wheel 5 is movable between two first successive half-teeth 4, and second half-wheel 500 including second hollows 51, inside each of which a first half-tooth 4 is movable between two successive second half-teeth 5. The two half-wheels 400 and 500 are thus mounted head-to-tail and fitted or encased one inside the other.

More particularly, elastic return means 6 are arranged to exert a resistance torque on one half-wheel with respect to the other, which means that the space between first half-teeth 4 and second half-teeth 5 is the same for all teeth 3 of wheel 1. When this wheel 1 is meshed with an opposing complementary wheel 10, anything that occurs at the meshed teeth 3 thus affects all the other teeth 3 of wheel 1.

The rest position, without mesh with a complementary wheel, corresponds to a play J between half-teeth 4 and 5 which is at its maximum value. Elastic return means 6, formed by spring 64 in the case of FIGS. 1 to 6, is slightly pre-wound. The value of this play J depends on the pre-winding of the spring, on the toothing module and the stop member: at rest the two half-teeth 4 and 5 of each tooth 3 move apart and, depending on the pre-winding of the spring, may move into abutment against the other half-tooth that surrounds it. In practice, and in a non-limiting manner, this maximum play is advantageously comprised between 0.05 and 0.07 mm.

Figure 8:
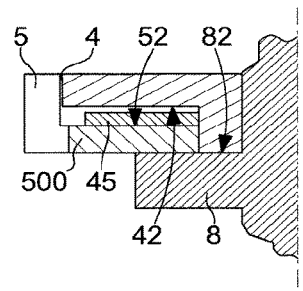
FIG. 8 represents a schematic cross-sectional view, passing through the axis of rotation, of a variant wheel according to the invention with a spacer washer inserted between the first upper half-wheel and the second lower half-wheel.
Figure 9:
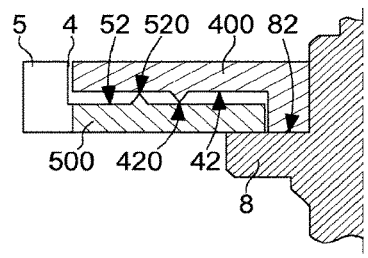
FIG. 9 represents a schematic cross-sectional view, passing through the axis of rotation, of another wheel variant according to the invention wherein the first upper half-wheel and the second lower half-wheel each includes, directed towards the other half-wheel, a rib for reducing the contact surface when they bear on each other.

The first half-wheel 400 includes a first bearing surface 42 arranged to cooperate in abutment, either with a second opposing bearing surface 52 comprised in second half-wheel 500, or with a spacer 45 captively mounted between first bearing surface 42 and second bearing surface 52, as seen in FIG. 8. In the FIG. 9 variant, first bearing surface 42 and/or second bearing surface 52 includes at least one rib 420, 520, which is arranged to minimise the contact surface with the opposing half-wheel.

One of the two half-wheels 400 or 500 is captively mounted between the other half-wheel 500, 400, and a hub 8 or similar.

An end-play JA between first half-wheel 400 and second half-wheel 500 is required for the freedom of whichever of the two is thus captively mounted. In the particular non-limiting embodiment of FIGS. 1 to 7, first half-wheel 400 is pressed onto a hub 8, abutting on a bearing surface 82 comprised in a shoulder 81 of hub 8, and confines second half-wheel 500, which pivots freely with respect to first half-wheel 400, here in a particular non-limiting manner via a bore 53, on a step 43 of first half-wheel 400.

Preferably, the first half-teeth 4 of first half-wheel 400 extend on either side of first bearing surface 42 and of second bearing surface 52, and the second half-teeth 5 of second half-wheel 500 also extend on either side of first bearing surface 42 and of second bearing surface 52.

In a particular embodiment, to facilitate the rotational freedom of the captive half-wheel, first bearing surface 42 and/or second bearing surface 52 includes a self-lubricating coating of the Teflon® or polytetrafluoroethylene type, or of the Rilsan® or polyundecanamide type also called PA 11, or similar, which is arranged to minimise friction with the opposing half-wheel. Bearing surface 82 of hub 8 may be coated in the same manner.

Figure 12:
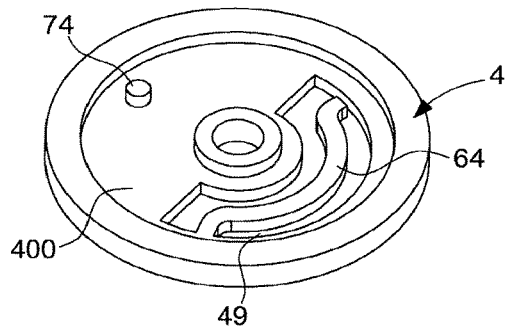
FIG. 12 represents, in a similar manner to FIG. 2, only the first upper half-wheel, in a variant wherein it includes both a first spring inside a first upper limit oblong opening, and a first pin.
Figure 13:
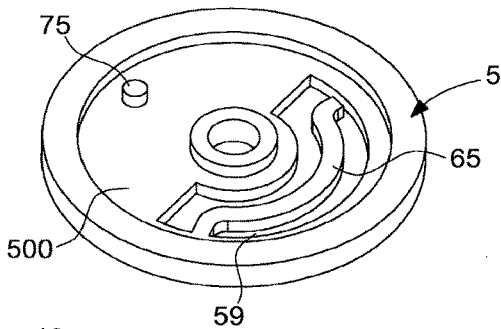
FIG. 13 represents, in a similar manner to FIG. 3, only the second half-wheel, in a variant wherein it includes both a second spring inside a second lower limit oblong opening, arranged for receiving the first pin of FIG. 12, and a second pin arranged to be housed inside the first oblong opening of FIG. 12 and to cooperate with the first spring.
Figure 17:
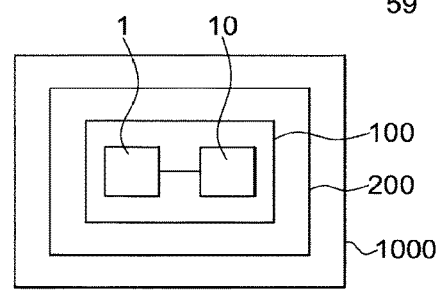
FIG. 17 is a block diagram representing a watch including a timepiece movement which in turn includes such a timepiece gear train with such a wheel according to the invention.
Figure 15:
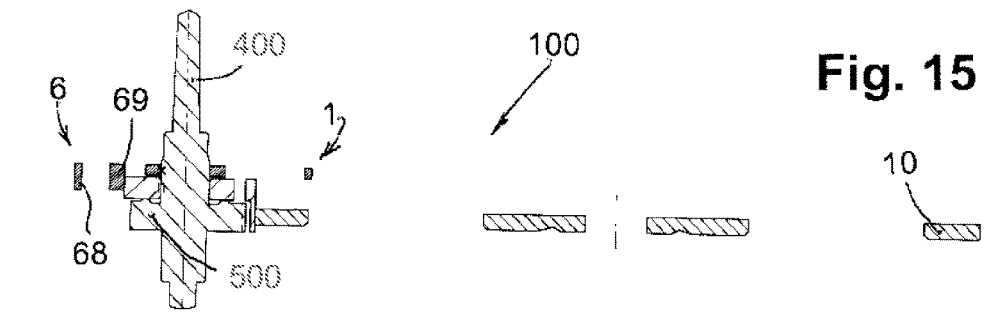
FIG. 15 represents a schematic cross-sectional view, passing through each axis of rotation, of the gear train of FIG. 14.
Figure 14:
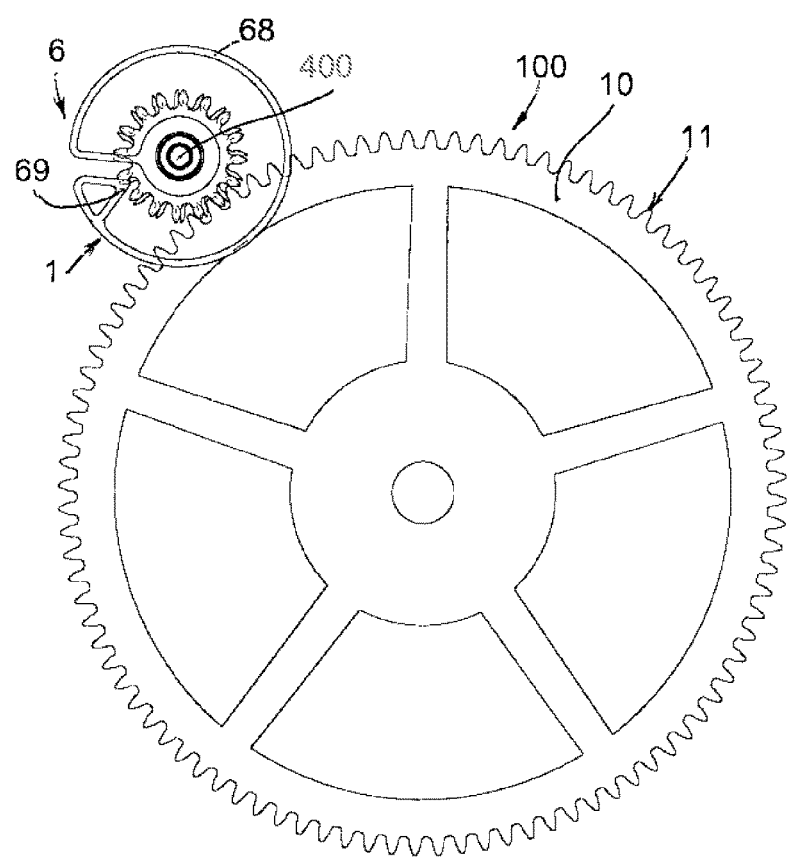
FIG. 14 represents a schematic top view of a gear train with a wheel according to the invention, comprising a spring fixed on the lower half-wheel which is arranged to carry a hand, this spring to exert a resistance torque on the upper half-wheel, this wheel cooperating with a third wheel.
Figure 16:
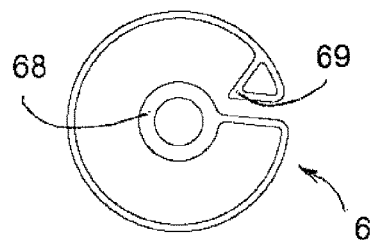
FIG. 16 represents a schematic top view of the spring of FIG. 14.

In a particular embodiment illustrated by the Figures, elastic return means 6 include at least one spring 64, 65, on at least the first half-wheel 400 or second half-wheel 500, this at least one spring 64, 65 being arranged to cooperate with a pin 75, 74, carried by the half-wheel opposite that which carries the spring. Preferably, each spring 64, 65 is housed inside an oblong opening 49, 59, which limits both the displacement of the spring and that of the pin concerned 75, 74. FIGS. 12 and 13 illustrate an arrangement wherein each half-wheel includes one such pin and one such spring. In a variant, it is also possible to achieve such a spring 64, 65 with a fork capable of resting on two opposite faces of the pin 75, 74. In a particular and advantageous manner, and particularly in the embodiments of the Figures, spring 64, 65 is in one-piece with the half-wheel 400, 500 that carries it, and pin 74, 75. Naturally, it is also possible to make the spring and/or the pin as an added component.

This spring 64, 65 is, in that case pre-wound, arranged, in a rest position of wheel 1 without mesh with another external component, to hold each half-tooth 4 and each second half-tooth 5 together forming one tooth 3, at a distance from each other.

Preferably and advantageously, at least the first half-wheel 400 or the second half-wheel 500 is made of a micromachinable material or of nickel-phosphorus or of silicon or of silicon oxide or of DLC, by means of a LIGA or MEMS method or similar; the geometry of each half-wheel is perfectly compatible with such methods.

The invention also concerns a timepiece train 100, including at least one such wheel 1, and a complementary wheel 10, whose opposing toothing 11 cooperates with both the first half-teeth 4 and with the second half-teeth 5. The air gap E between wheel 1 and complementary wheel 10 is adjusted so that the play between each first half-tooth 4 and each second half-tooth 5 of the same tooth 3, in the meshing position, is less than the play in the rest position in the absence of a complementary wheel between first half-tooth 4 and second half-tooth 5. The operating position of wheel 1 in mesh with complementary wheel 10 corresponds to a non-zero play J between the two half-teeth 4 and 5, which is of lower value than that of the maximum play at rest, to ensure that half-teeth 4 and 5 clamp the opposing toothing 11 of complementary wheel 10. The value of the operating play is advantageously, but not limited to, between 0.04 and 0.05 mm. There can only be contact between the half-teeth 4 and 5 of the same tooth 3 in the event of an impact on composite wheel 1, or on complementary wheel 10. The play J between half-teeth 4 and 5 may, however, vary to compensate for manufacturing errors or an air gap defect.

Figure 7:
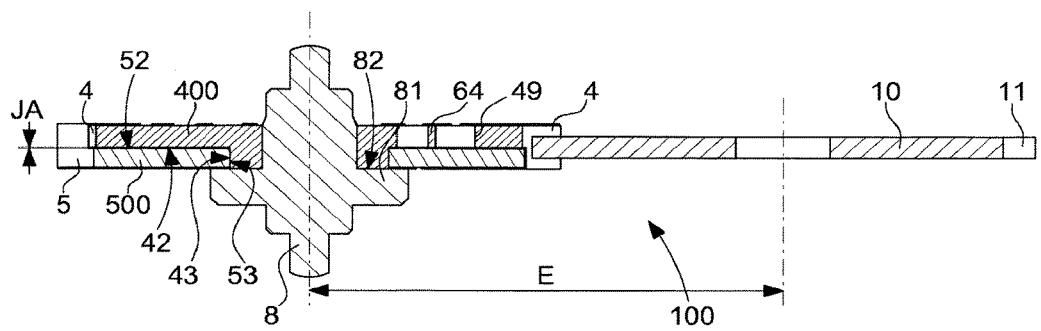
FIG. 7 represents a schematic cross-sectional view, passing through the axes of rotation of its two constituent wheels, of the gear train of FIG. 4, with the complementary wheel toothing substantially in the middle of the composite toothing of the composite wheel according to the invention, facing the two plates of the two half-wheels of said composite wheel.
Figure 10:
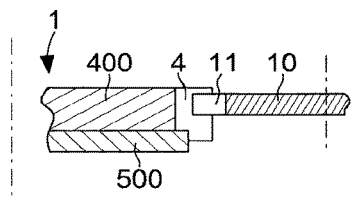
FIG. 10 represents another variant, in a similar manner to FIG. 7, wherein the complementary wheel toothing meshes only with the upper part of the composite toothing of the composite wheel, and facing only the plate of the first upper half-wheel.
Figure 11:
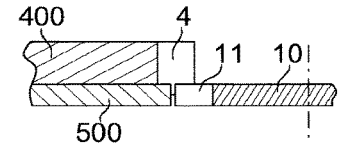
FIG. 11 represents another variant, in a similar manner to FIG. 10, wherein the complementary wheel toothing meshes only with the lower part of the composite toothing of the composite wheel, and facing only the plate of the second lower half-wheel.

The cross-section of FIG. 7 represents a particular case of mesh with complementary wheel 10 on a median plane, to ensure mesh security. However, it is of course possible to mesh on only one of half-wheels 400 or 500, as seen in FIGS. 10 and 11: mesh is possible on any level, which is a major advantage of the invention.

FIGS. 14 to 17 show an alternative variant of a gear train comprising a wheel 1 according to the invention, comprising the elastic return means 6 including a spring 68 fixed on the lower half-wheel 400 which is arranged to carry a hand, this spring 68 exerting a resistance torque on the upper half-wheel 500. In a non-limiting manner in this example the complementary wheel 10 is here a third wheel, and wheel 1 for example is an indirect small seconds wheel. The upper half-wheel 500 freely swivels on the arbour of the lower half-wheel 400, and the spring 68 comprises a beak 69 co-operating with the teeth of the upper half-wheel 500, in order to compensate the gear play.

The invention also concerns a timepiece movement 200 including at least one such timepiece train 100, or including at least one such wheel 1.

The invention also concerns a watch 1000 including such a movement 200, or including at least one such timepiece train 100, or including at least one such wheel 1.

What is claimed is:

1. A composite timepiece wheel with play take-up, comprising:
   a peripheral toothing, each tooth of which includes, on either side of a median part thereof, a first half-tooth including a first part of a tooth profile, and a second half-tooth including a second part of the tooth profile, each said first half-tooth being movable with respect to said second half-tooth of the same said tooth, against elastic return means tending to move said first half-tooth and said second half-tooth of the same said tooth away from each other,
   wherein said wheel includes, axially stacked, a first half-wheel carrying all said first half-teeth, and a second half-wheel carrying all said second half-teeth, said first half-wheel and said second half-wheel having limited rotational mobility with respect to each other, about an axis of said toothing, and against said elastic return means,
   wherein said first half-wheel includes first hollows between each of said first half-teeth, and each second half-tooth of said second half-teeth of the second half-wheel extends into the first hollows such that each second half-tooth extends between two first successive half-teeth in a rotational plane of the first half-wheel, and
   wherein said second half-wheel includes second hollows between each of said second half-teeth, and each first half-tooth of said first half-teeth of the first half-wheel extends into the second hollows such that each first half-tooth extends between two successive second half-teeth in a rotational plane of the second half-wheel.

2. The timepiece wheel according to claim 1, wherein said first half-wheel comprises a first bearing surface arranged to cooperate in abutment, either with a second opposing bearing surface comprised in said second half-wheel, or with a spacer captively mounted between said first bearing surface and said second bearing surface.

3. The timepiece wheel according to claim 2, wherein said first half-teeth of said first half-wheel extend on either side of said first bearing surface and of said second bearing surface, and said second half-teeth of said second half-wheel also extend on either side of said first bearing surface and of said second bearing surface.

4. The timepiece wheel according to claim 2, wherein said first bearing surface and/or said second bearing surface comprises at least one rib, arranged to minimise a contact surface with the opposing half-wheel.

5. The timepiece wheel according to claim 2, wherein said first bearing surface and/or said second bearing surface comprises a self-lubricating coating of polytetrafluoroethylene or polyundecanamide, arranged to minimise friction with the opposing half-wheel.

6. The timepiece wheel according to claim 1, wherein said elastic return means comprise at least one spring, on at least said first half-wheel or said second half-wheel, said at least one spring being arranged to cooperate with a pin, carried by the half-wheel opposing that carrying said spring.

7. The timepiece wheel according to claim 6, wherein said spring is in one piece with the half-wheel that carries said spring.

8. The timepiece wheel according to claim 6, wherein said spring is pre-wound, arranged, in a rest position of said wheel without mesh with another external component, to hold each said first half-tooth and each said second half-tooth, together forming one said tooth, at a distance from each other.

9. The timepiece wheel according to claim 6, wherein said pin is in one piece with the half-wheel that carries said pin.

10. The timepiece wheel according to claim 1, wherein at least said first half-wheel or said second half-wheel is made of micromachinable material or of nickel-phosphorus or of silicon or of silicon oxide or of DLC.

11. A timepiece gear train comprising:
    at least one said wheel according to claim 1, and
    a complementary wheel whose toothing cooperates both with said first half-teeth and with said second half-teeth, the air gap between said wheel and said complementary wheel being adjusted so that play between each first half-tooth and each second half-tooth of a tooth in a meshing position is less than the play in rest position in the absence of any complementary wheel between said first half-tooth and said second half-tooth.

12. The timepiece gear train according to claim 11,
    wherein said wheel comprises said elastic return means including a spring fixed on said first half-wheel which is arranged to carry a hand, said spring exerting a resistance torque on said second half-wheel,
    wherein said complementary wheel is a third wheel,
    wherein said wheel is an indirect small seconds wheel, said second half-wheel freely swivelling on an arbour of said first half-wheel, and
    wherein said spring comprises a beak co-operating with the teeth of said second half-wheel, in order to compensate gear play.

13. A timepiece movement comprising:
at least one timepiece train according to claim 11.
14. A watch comprising:
the timepiece movement according to claim 13.

* * * * *